United States Patent [19]

Gloria et al.

[11] Patent Number: 4,618,282

[45] Date of Patent: Oct. 21, 1986

[54] COMPOSITION AND A METHOD FOR COVERING THE SUMP IN CAVITIES

[75] Inventors: Karl F. L. Gloria, Hattingen; Alexandru B. Costinescu-Tataranu, Essen; Wilhelm Schuster; Jürgen Wittekind, both of Frankfurt, all of Fed. Rep. of Germany

[73] Assignee: Ruhrgas Aktiengesellschaft, Essen, Fed. Rep. of Germany

[21] Appl. No.: 526,081

[22] Filed: Aug. 24, 1983

[30] Foreign Application Priority Data

Aug. 24, 1982 [DE] Fed. Rep. of Germany ....... 3231349

[51] Int. Cl.$^4$ .............................................. B65G 5/00
[52] U.S. Cl. ........................................ 405/53; 405/59
[58] Field of Search ...................... 405/53, 55, 57, 59, 405/210; 422/43

[56] References Cited

U.S. PATENT DOCUMENTS

| | | |
|---|---|---|
| 2,942,424 | 6/1960 | Koble . |
| 3,095,263 | 6/1963 | Eckert et al. .................... 422/43 |
| 3,738,807 | 6/1973 | Horowitz et al. . |
| 3,745,770 | 7/1973 | Fraser et al. .................... 405/59 |
| 4,147,658 | 4/1979 | Savoit et al. ................ 422/43 X |
| 4,209,271 | 6/1980 | McCabe et al. .................. 405/210 |

FOREIGN PATENT DOCUMENTS

| | | |
|---|---|---|
| 2416591 | 4/1974 | Fed. Rep. of Germany . |
| 2346740 | 3/1975 | Fed. Rep. of Germany . |
| 2539720 | 3/1977 | Fed. Rep. of Germany . |
| 2119805 | 8/1972 | France . |
| 2243893 | 4/1975 | France . |
| 2322804 | 4/1977 | France . |

Primary Examiner—David H. Corbin

[57] ABSTRACT

Disclosed is a composition and a method for covering the sump in cavities serving to store gaseous or liquid, non-aqueous substances, using a so-called geologically old crude oil to which is added a reactive component which combines with the functional groups thereof and blocks them. Particularly suitable reactive components are isocyanates and epoxy compounds.

14 Claims, 2 Drawing Figures

COMPOSITION AND A METHOD FOR COVERING THE SUMP IN CAVITIES

BACKGROUND OF THE INVENTION

The invention relates to the field of covering, and preventing the evaporation of an aqueous liquid, more particularly to a composition and a method for covering the sump in cavities leached, for example, out of salt-domes and serving to store gaseous or liquid, non-aqueous substances.

U.S. Pat. No. 4,403,887, which is hereby expressly made a part of the disclosure of the present invention, describes a method for covering cavities with a crude oil containing not more than 7% by weight of hydrocarbons having at the most 5 C-atoms in the molecule, the specific weight thereof amounting, at a temperature of 20° C., to at the most 1.2 g/cm$^3$, the said crude oil by applied to the sump in the form of a layer at least 1 cm in thickness. This method is used in cavities to store gases of all kinds, especially combustible gases such as natural gas, methane, propane, butane and mixtures thereof, mineral products, but also air. The storage media may be gaseous or liquid; they may also be partly gaseous and partly liquid.

The purpose of a crude-oil sump covering of this kind is largely to prevent the passage of water or water-vapour from the sump to the storage medium. The water-absorption of the storage medium may thereby be reduced to about one thousandth of the value obtained with an uncovered sump.

The said publication contains a calculation of the change in the dew-point of natural gas, based upon laboratory tests. The cavity was of normal dimensions, i.e. having a capacity of about 250 000 to 350 000 m$^3$ and a surface area of about 900 to 1 100 m$^2$. It is assumed that the gas remains in storage for about one year at a pressure of about 70 bars. The resulting dew-point changes are as follows:

| | |
|---|---|
| with no sump-cover | from $-8°$ C. to $+38°$ C. |
| with a 10 mm sump-cover | from $-8°$ C. to $-6°$ C. |
| with a 250 mm sump-cover | from $-8°$ C. to $-7°$ C. |

A sump-cover of this kind eliminates the need for drying units which are otherwise required to lower the dew-point of the gas removed from storage, and possibly saturated with water-vapour, to such an extent that it can be transported by pipeline or used for some other purpose.

However, since the period of storage in cavities may also be substantially longer, there has hitherto been a reluctance to dispense completely with the costly drying units.

SUMMARY OF THE INVENTION

The main purpose of the invention is to improve the impermeability of the cover to water, especially of covers over cavities for the storage of gases.

To this end, the covering composition contains a mixture of:

crude oil containing an amount not exceeding 7% by weight of hydrocarbons having at the most 5 C-atoms in the molecule, the specific weight thereof amounting, at a temperature of $+20°$ C. to at the most 1.2 g/cm$^3$; and at least one reactive component which combines with the functional groups of the crude oil and blocks them.

In the relevant literature, the heavy oils used according to the invention are described as a complex mixture of hydrocarbons of various kinds existing in a colloidal system. The physical and chemical behaviour of such oils is determined largely by their micelle structure:

Molecules of medium size are attached to one or mole molecules of very high molecular weight which are chemically inert. Small molecules are inserted in turn into this spatial agglomerate and these are presumably to be regarded as carriers of functional groups.

The invention is based upon the knowledge that water is transported through the crude oil by the functional groups thereof, for example the OH groups. The water migrates, from one functional group to another, to the surface of the sump-cover, passing thence into the storage medium. This transportation of water is suppressed in that, according to the invention, the said functional groups are blocked.

When, according to the method of the invention, the said liquid, or at least fluid, mixture of crude oil and the reactive component is applied, as a closed layer at least 1 cm in thickness, to the sump of a cavity, this produces a sump-cover which is almost impermeable to water. This not only makes it unnecessary to operate the drying units; it also makes them superfluous.

The resulting economic saving is considerable.

The reactive component may be, for example, phosgene which reacts with alcohol to chloroformic-acid ester and hydrochloric acid and, with amine, to chloroformic-acid amide and hydrochloric acid. It is also possible to use phosphoryl-chloride which reacts with alcohol to phosphoric-acid-ester dichloride and hydrochloric acid and, with amine, to phosphoric-acid amide dichloride and hydrochloric acid. However, the presence of hydrochloric acid is undesirable from the point of view of corrosion. Dimethyl sulphate may be mentioned as another reactive component which reacts with alcohol to methyl-ether and methyl-sulphate and, with amine, to methylamine and methyl-sulphate. The methyl-sulphate may produce sulphuric acid which also introduces the danger of corrosion. Finally, it may be said of the above-mentioned reactive components that the reaction products may react further in an unpredictable manner, depending upon environmental conditions.

It is therefore preferable to mix an isocyanate with the crude oil as the reactive component. It has been found that isocyanate is particularly suitable for blocking the functional groups of the crude oil.

The reactions with isocyanates are based upon the reactivity of the isocyanate group —N=C=O with compounds containing active hydrogen atoms, for example alcohols, water, amines and carboxylic acids. These reactions proceed as follows:

(1) Isocyanate   Alcohol   Urethane

(2) Isocyanate   Water   Urea (3) Isocyanate   Amine   Urea (4) Isocyanate + Carboxylic Acid → Acid Amide Di- and trimerized isocyanates and isocyanate adducts either react similarly with their still free R—N=C=O groups, or by opening their isomer-bridges. The latter may explain the surprisingly high reactivity of these products under the present conditions.

As regards the industrial use of isocyanates, it is of particular significance that these partly highly toxic compounds produce non-toxic reaction products after being fully reacted.

For use as a brine covering, an excess of isocyanate in the oil is unobjectionable since, even if a part of the said isocyanate were to pass into the stored gas, it would be converted with the initial moisture therein, according to equation (2), into a non-toxic reaction product (urea). This water reaction will also cause any water still present in the covering oil to be converted in the event of an excess of isocyanate, thus producing extensive dehydration of the oil. Even with a relatively large excess of isocyanate, the amount of urea arising is so small that it causes no objectionable contamination of the sump.

Monofunctional isocyanates, for example aliphatic octadecylisocyanate, may be used. However, this component produces only a slight, possibly inadequate, increase in the viscosity of the crude oil.

On the other hand, if, according to the invention, a polyfunctional isocyanate is mixed with the crude oil, then reaction with a polyfunctional partner, such as crude oil, produces cross-linking and thus an increase in viscosity. This reduces, or completely eliminates, flow-processes in the covering layer. In spite of this, the absolutely necessary self-healing property of the sump-cover is retained. Thanks to its specific weight, the covering layer floats reliably upon the surface of the sump and coalesces again when pierced with fragments of rock or the like. It also allows any sump-liquid reaching the surface to sink back again.

A difunctional isocyanate is preferably mixed with the crude oil. Particularly satisfactory results were obtained with toluylene-diisocyanate as sold under the name of Desmodur T 65 by Messrs. Bayer. It has the following formula:

and is available for industrial use as a mixture of the 2,4- and 2,6-compound.

In addition to its good reactivity, this isocyanate has the advantage of being fluid and of having a viscosity of about $3.10^{-3}$ at 25° C.

It is therefore easily pumped and mixes with the crude oil without difficulty.

Although toluylene-diisocyanate is toxic and possesses a considerable vapour-pressure at room-temperature, its pungent smell has such an irritant action that failure of the necessary protective measures is immediately obvious.

After complete reaction, its reaction products are non-toxic as long as participant in the reaction is itself non-toxic, as in the case of crude oil.

In the case of toluylene-diisocyanate it was found particularly desirable to add this component in an amount of at the most 2% by weight of the crude oil. Tests showed that 90% of this amount combines with the functional groups of the crude oil.

Dimerized toluylene-diisocyanate (Desmodur TT) also pertains to this group of difunctional components. In this case, a very small addition produces a marked increase in viscosity. Unfortunately it is in the form of powder and is insoluble, and its admixture may present problems.

Reference is also made to an addition product consisting of toluylene-diisocyanate and polypropylene-glycol (Desmodur 1361), but this produces only a small increase in viscosity and there is a danger of solid reaction-products separating oil.

On the other hand, this does not occur in the case of the cycloaliphatic isocyanate isophorone-diisocyanate (IPDI). This component behaves as well as Desmodur T 65 and also has a low vapour-pressure, thus reducing the danger of contaminating the atmosphere.

Initial acceleration of the increase in viscosity, and a subsequent delay, is obtained by using isophorone-diisocyanate with 0.3% of dibutyl-tin-dilaurate. An accelerated increase in viscocity is also produced by the urea-containing adduct based upoon isophorone-diisocyanate, namely the IPDI adduct H 29 21.

The invention also provides for the admixture of a trifunctional isocyanate to the crude oil as the reactive component, as with the use of a difunctional isocyanate.

The aromatic isocyanate Desmodur L 67 is a trifunctional isocyanate. However, this produces a relatively slight increase in viscosity and brings with it the danger of solid reaction-products separating out.

On the other hand, the use of trimerized isophorone-diisocyanate "polyisocyanate IPDI T 189/100" is particularly advantageous. Evan a small amount of this produces a considerable increase in viscosity. Although this component is in the form of a powder, it is soluble and its admixture presents no problems.

As an important alternative, the invention provides for the admixture of an epoxy compound to the crude oil as the reactive componet. It has been found that epoxy compounds are also particularly suitable for blocking the functional groups of the crude oil, thus preventing the passage of water through the sump-cover.

Compounds with epoxy groups of the general formula:

can react with plurality of compounds containing active hydrogen atoms. These reactions proceed as follows, for example:

(5)

(10)

(15)

The OH- and NH-hydrogen atoms existing after the primary reaction react, in turn, with epoxy groups, forming larger molecules.

In this case, according to the invention, the cycloaliphatic epoxy compound epoxy-cyclohexylohexyl-methyl-epoxy-cyclohexane-carboxylate (Araldit CY 179 clarified), or a medium-viscosity epoxy resin based on bisphenol A-epi-chlorhydrin (Eurepox 710), is mixed with the crude oil.

It is desirable for the reactive component to be added to the crude oil in an amount such that the NCO content thereof corresponds to that of an admixture of 2% by weight of toluylene-diisocyanate (Desmodur T 65).

It is desirable for the reactive component to be admixed before or during the introduction of the crude oil into the cavity, since this ensures uniform mixing.

BRIEF DESCRIPTION OF THE DRAWINGS

The invention will be better understood by the following more detailed description and the accompanying drawings, wherein.

DESCRIPTION OF PREFERRED EMBODIMENTS

In order to demonstrate the usefulness of the invention, tests were carried out with the following useful crude oils:

|  | Tia-Juana-Oil | Boscan-Oil |
|---|---|---|
| $H_2O$ (Karl Fischer): | 0.048% | 0.108% |
| Primary amines: | 0.48% | 0.40% |
| Total nitrogen: | 0.43% | 0.61% |
| Active hydrogen: | 0.040% | 0.070% |
| Secondary amines: | about 0.2–0.3% | |

Analysis does not admit differentiated association of the active hydrogen with OH groups and amine groups. It shows, however, that the prerequisites for reactions with isocyanates and epoxy compounds exists in both oils.

The following components were tested as reactive components:

---

Desmodur T 65

(Toluylene-diisocyanate)

| Liquid viscosity (25° C.) | 3 mPa s |
|---|---|
| NCO content | 48.3% |
| Flash-point | 127° C. |
| Boiling point | 246–247° C. |
| Density (20° C.) | 1.22 g/cm$^3$ |
| Vapour-pressure (20° C.) | $3 \cdot 10^{-2}$ mbar |
| MAK-value | 0.02 ppm |
| Toxic | |
| Manufacturer | Bayer AG |
| Price | 5.85 DM/kg* |

Desmodur L 67

(Trifunctional aromatic isocyanate)

| Liquid 67% solution in ethylene-glycol-acetate/xylene | |
|---|---|
| Viscosity | about 2 000 mPa s |
| NCO content | 11.5% |
| Flash-point | about 30° C. |
| Density (20° C.) | about 1.16 g/cm$^3$ |
| Largely non-toxic | |
| Manufacturer | Bayer AG |
| Price | 5.65 DM/kg |

Octadecylisocyanate (Monofunctional aliphatic isocyanate)

| Liquid | |
|---|---|
| NCO content | 14.2% |
| Flash-point | 137° C. |
| Boiling point | 170–180° C. |
| Density (25° C.) | 0.86 g/cm$^3$ |
| Toxic, highly irritant to skin and mucous membranes | |
| Manufacturer | Hoechst Ag |
| Price | about 11.-- DM/kg |

Isophorone-diisocyanate (IPDI)

(Difunctional cycloaliphatic isocyanate)

| Liquid, viscosity (20° C.) | 15 mPa s |
|---|---|
| NCO content | 37.8% |
| Flash-point | 142° C. |
| Boiling point (10 mbar) | 153° C. |
| Density (20° C.) | 1.06 g/cm$^3$ |
| Vapour-pressure (20° C.) | about 0.3 mbar |
| Relatively non-toxic because of low vapour-pressure | |
| Manufacturer | Chem. Werke Huls |
| Price | 13.40 DM/kg |

Desmodur TT (Dimerized toluylene diisocyanate difunctional)

| Solid, in powder form, insoluble | |
|---|---|
| NCO content | 24.3% |
| Melting point | >145° C. |
| Density (20° C.) | 1.48 g/cm$^3$ |
| Bulk weight | 0.4 g/cm$^3$ |
| Relatively non-toxic, dust should not be breathed, | |
| Slightly irritating to skin and mucous membranes | |
| Manufacturer | Bayer AG |
| Price | 19.65 DM/kg |

Desmodur 1361

Addition-product of toluylene-diisocyanate and

-continued polypropyleneglycol
Liquid, 61% solution in ethylglycol-acetate/xylene
| | |
|---|---|
| Viscosity (20° C.) | about 500 mPa s |
| NCO content | about 6.5% |
| Density (20° C.) | 1.07 g/cm³ |
| Flash-point | about 32° C. |
| Slightly toxic | |
| Manufacturer | Bayer AG |
| Price | 5.78 DM/kg |

Araldit CY 179 clarified

Epoxycyclohexylohexylmethylepoxycyclohexanecarboxylate; cycloaliphatic epoxy compound
| | |
|---|---|
| Liquid, viscosity (25° C.) | 400 mPa s |
| Epoxy value | 0.74 |
| Flash-point | >100° C. |
| Slightly toxic | |
| Manufacturer | Ciba-Geigy GmbH |
| Price | 19.75 DM/kg |

IPDI-Adduct H 29 21

Urea-group containing adduct based upon isophorone-diisocyanate
| | |
|---|---|
| Liquid, viscosity (25° C.) | about 12 Pa s |
| NCO content | 28% |
| Flash-point | 157° C. |
| Density (20° C.) | 1.07 g/cm³ |
| Relatively non-toxic because of low vapour-pressure | |
| Manufacturer | Chem. Werke Huls |
| Price | 12.45 DM/kg |

Eurepox 710

Medium-viscosity epoxy resin based upon bisphenol A-epichlorhydrin
| | |
|---|---|
| Epoxy value | 0.51–0.56 |
| Flash-point | about 250° C. |
| Density (20° C.) | 1.167 g/cm³ |
| Slightly toxic | |
| Manufacturer | Schering AG |
| Price | 7.-- DM/kg |

Polyisocyanate IPDI T 1890/100

Trifunctional, trimerized isophorone diisocyanate
Solid, delivered in the form of granules
Soluble in ketones, esters, aromatics, chlorinated KW and benzine hydrocarbons
T 1890 is also available commercially as a solution
| | |
|---|---|
| NCO content | 17% |
| Density (20° C.) | 1.15 g/cm³ |
| Bulk density | 0.6 kg/l |
| Slightly toxic, skin and respiratory passages to be protected from dust. | |
| Manufacturer | Chem. Werke Huls |
| Price | 17.20 DM/kg |

*The prices are based upon 1 ton deliveries

TEST-GROUP 1

As an initial reaction-criterion, the increase in viscosity in Tia Juano oil, produced by the reactive components described hereinbefore, was tested.

For the purpose of investigation reaction-behaviour, the corresponding additives were mixed intensively in each case into 200 g of Tia Juana oil heated to 200 g. The amount added was based upon the NCO content of a 2% addition of toluylene diisocyanate; in the case of isocyanates differing in NCO content from toluylene diisocyanate, a conversion was made to arrive at the same amount of NCO.

In the case of isocyanate, pronounced development of gas occurred in the course of about 60 min.

The viscosity behaviour of the batches was checked over a period of 4 h in a Contraves STV Rheometer, measurement system B. The batches were then stored in a closed glass vessel at 80° C. The viscosity of the samples was determined at 80° C. at predetermined intervals.

The viscosity measurements were carried out at shearing rates of 9.24, 28.9 and 32.9 s$^{-1}$. Deviations in the measured values of function of shearing rate showed that the modified oils have no precise Newton rheological pattern. The measurements are given in Tables 1 and 2.

TABLE 1

Viscosity-changes in Tia Juana oil produced by additives as a function of shearing rate D. D = 9.24, 28.9, 90.2 s$^{-1}$.

| Measuring Time | Zero Sample Tia-Juana-Oil Pa s | 8.4% Desmodur L 67 Pa s | 2% Desmodur T 65 Pa s |
|---|---|---|---|
| 0.5 h | 0.317/0.304/0.313 | 0.246/0.214/0.214 | 0.422/0.383/>0.360 |
| 1 h | — | 0.246/0.225/0.221 | 0.458/0.439/— |
| 2 h | — | 0.246/0.225/0.221 | 0.492/0.473/— |
| 3 h | — | 0.246/0.225/0.223 | 0.528/0.495/— |
| 4 h | — | 0.246/0.231/0.232 | 0.528/0.518/— |
| 24 h | 0.317/0.315/0.317 | 0.282/0.248/0.252 | 0.686/0.664/— |
| 48 h | — | — | 0.722/0.709/— |
| 72 h | — | 0.264/0.242/0.245 | — |
| 1 Wk | 0.352/0.326/0.328 | 0.282/0.253/0.256 | 0.915/0.911/— |
| 2 Wk | 0.282/0.270/0.266 | 1.373/>1.125/— | |
| | 0.352/0.-326/0.331 | | |
| 3 Wk | 0.352/0.326/0.335 | 0.317/0.270/0.302 | 1.654/— |
| 4 Wk | 0.352/0.338/0.346 | 0.317/0.270/0.306 | 1.830/— |
| 8 Wk | 0.352/0.338/0.338 | 0.387/0.349/0.353 | 2.605/— |
| 12 Wk | | | 3.168/— |
| 16 Wk | | | *4.578/3.556/2.881 |
| Measuring | 6.8% Octadecylisocyanate | 2.7% Isophorone-diisocyanate | 2.7% Isophorone-diisocyanate + 0.3% Dibutyltin Dilaurate |

TABLE 1-continued

Viscosity-changes in Tia Juana oil produced by additives as a function of shearing rate D. D = 9.24, 28.9, 90.2 s⁻¹.

| Time | Pa s | Pa s | Pa s |
|---|---|---|---|
| 0.5 h | —/0.186/0.180 | 0.352/0.338/0.331 | 0.352/0.349/0.342 |
| 1 h | —/0.186/0.180 | 0.352/0.338/0.335 | 0.352/0.349/0.342 |
| 2 h | —/0.186/0.184 | 0.387/0.349/0.339 | 0.387/0.383/0.360 |
| 3 h | —/0.191/0.191 | — | 0.387/0.383/— |
| 4 h | —/0.203/0.198 | — | — |
| 24 h | —/0.203/0.198 | — | 0.458/0.439/— |
| 48 h | — | 0.458/0.439/>0.360 | 0.493/0.461/— |
| 72 h | — | — | — |
| 1 Wk | 0.264/0.263/0.238 | — | 0.528/0.518/— |
| 2 Wk | 0.282/0.248/0.248 | 0.563/0.563/— | 0.634/0.619/— |
| 3 Wk | 0.282/0.270/0.263 | 0.634/0.608/— | 0.704/0.686/— |
| 4 Wk | 0.282/0.270/0.263 | 0.704/0.709/— | — |
| 8 Wk | 0.317/0.281/0.284 | 0.810/0.810/— | 0.810/0.797/— |
| 12 Wk | 0.352/0.315/0.302 | — | — |
| 16 Wk | | 0.915/0.911/— | 0.915/0.934/— |

*Measuring System C, D = 5.83, 18.23, 57.0 s⁻¹

TABLE 2

Viscosity-changes in Tia Juana oil produced by additives as a function of shearing rate D. D = 9.24, 28.9, 90.2 s⁻¹.

| Measuring Time | 0.25% Desmodur TT Pa s | 15% Desmodur 1361 Pa s | 7.5% Araldit Cy 179 Pa s |
|---|---|---|---|
| 0.5 h | 0.528/0.450/>0.360 | 0.211/0.169/0.169 | 0.264/0.236/0.234 |
| 1 h | 0.669/0.563/— | 0.211/0.169/0.162 | 0.264/0.236/0.234 |
| 2 h | 0.739/0.630/— | 0.211/0.180/0.173 | 0.264/0.236/0.241 |
| 3 h | 0.739/0.641/— | — | 0.264/0.248/0.245 |
| 4 h | — | 0.211/0.180/0.180 | 0.282/0.248/0.248 |
| 24 h | 0.915/0.765/— | 0.211/0.180/0.180 | 0.282/0.259/0.266 |
| 48 h | 1.091/0.866/— | 0.211/0.180/0.173 | 0.299/0.270/0.277 |
| 72 h | — | | 0.317/0.281/0.288 |
| 1 Wk | 1.056/0.844/— | | 0.317/0.293/0.295 |
| 2 Wk | 1.302/0.990/— | | 0.317/0.304/0.306 |
| 3 Wk | — | | 0.317/0.304/0.310 |
| 4 Wk | 1.338/1.012/— | | 0.352/0.304/0.310 |
| 8 Wk | — | | 0.352/0.315/0.317 |
| 12 Wk | 1.478/1.091/— | | 0.352/0.338/0.338 |
| 16 Wk | | | |

| Measuring Time | 8% Eurepox 710 Pa s | 3.25 IPDI-Adduct H 2921 Pa s | 6% IPDI T 1890/100 Pa s |
|---|---|---|---|
| 0.5 h | 0.282/0.259/— | 0.458/0.439/>0.360 | 0.422/0.405/>0.360 |
| 1 h | 0.282/0.270/— | 0.493/0.461/— | 0.458/0.428/— |
| 2 h | 0.282/0.270/0.280 | 0.528/0.495/— | 0.458/0.461/— |
| 3 h | 0.317/0.281/0.288 | — | 0.458/0.484/— |
| 4 h | 0.317/0.293/0.295 | 0.563/0.529/— | 0.528/0.506/— |
| 24 h | 0.352/0.315/0.320 | 0.598/0.563/— | 0.704/0.709/— |
| 48 h | 0.352/0.338/0.342 | 0.598/0.574/— | 0.845/0.855/— |
| 72 h | 0.387/0.349/0.353 | — | 0.950/0.934/— |
| 1 Wk | 0.387/0.383/>0.360 | 0.669/0.664/— | 1.197/>1.25/— |
| 2 Wk | 0.422/0.416/— | 0.739/0.731/— | 1.443/— |
| 3 Wk | 0.458/0.450/— | 0.810/0.810/— | 1.619/— |
| 4 Wk | 0.493/0.473/— | 0.880/0.878/— | 2.288/— |
| 8 Wk | 0.528/0.506/— | 0.950/0.956/— | *4.905/4.500/— |
| 12 Wk | | 0.986/0.986/— | |
| 16 Wk | | | |

*Measuring System C, D = 5.83, 18.23 s⁻¹

Also given are viscosity-changes as a factor after four weeks of testing:

| Substances | Factor of Viscosity-Changes |
|---|---|
| Desmodur T 65 (Isocyanate) | 4.34 |
| Desmodur L 67 (Isocyanate) | 1.26 |
| Octadecylisocyanate | 1.45 |
| Isophorone diisocyanate (IPDI) | 2.10 |
| Desmodur TT 0,25% Addition (dimerized toluylene diisocyanate) | 2.25 |
| Desmodur 1361 (Isocyanate) | about 1.20 |
| Isophorone diisocyanate + 0,3% dibutyl tin di-laurate | about 2.0 |
| Araldit CY 179 (Epoxy compound) | 1.29 |
| IPDI-Adduct H 29 21 (Isocyanate) | 2.0 |
| Eurepox 710 (Epoxy compound) | 1.82 |
| Polyisocyanate IPDI T 1890/100 | 5.40 |

During this time, a Tia Juana oil, measured without any addition as a zero sample, changed its viscosity by a factor of only 1.11.

After a reaction time of about 8 weeks, the test batches were checked for residual content of unreacted additives. The analysis showed that isocyanates were no longer present or appeared only as traces (<0.03%).

Eurepox was also no longer detectable. Of the 7.5% of Araldit added, 5.15% still remained in the oil.

In order to obtain information as to the effect of additives upon water-diffusion behaviour, covering tests were carried out with two substances in an autoclave. To this end, the oil-additives to be investigated were stored for 24 h at 80° C. before they were placed in the autoclave as a brine covering. In these tests a layer thickness of 10 mm was used in order to shorten the measuring time. The gas pressure was 100 bars at a temperature of 50° C.

After about 200 h, a water-vapour equilibrium had been established in the gas being measured (dew-point about 17° C.). The gas content was then removed. After careful flushing of the equipment with dry natural gas, a new charge of gas was introduced, with the same covering for a second measurement.

Figure 1:
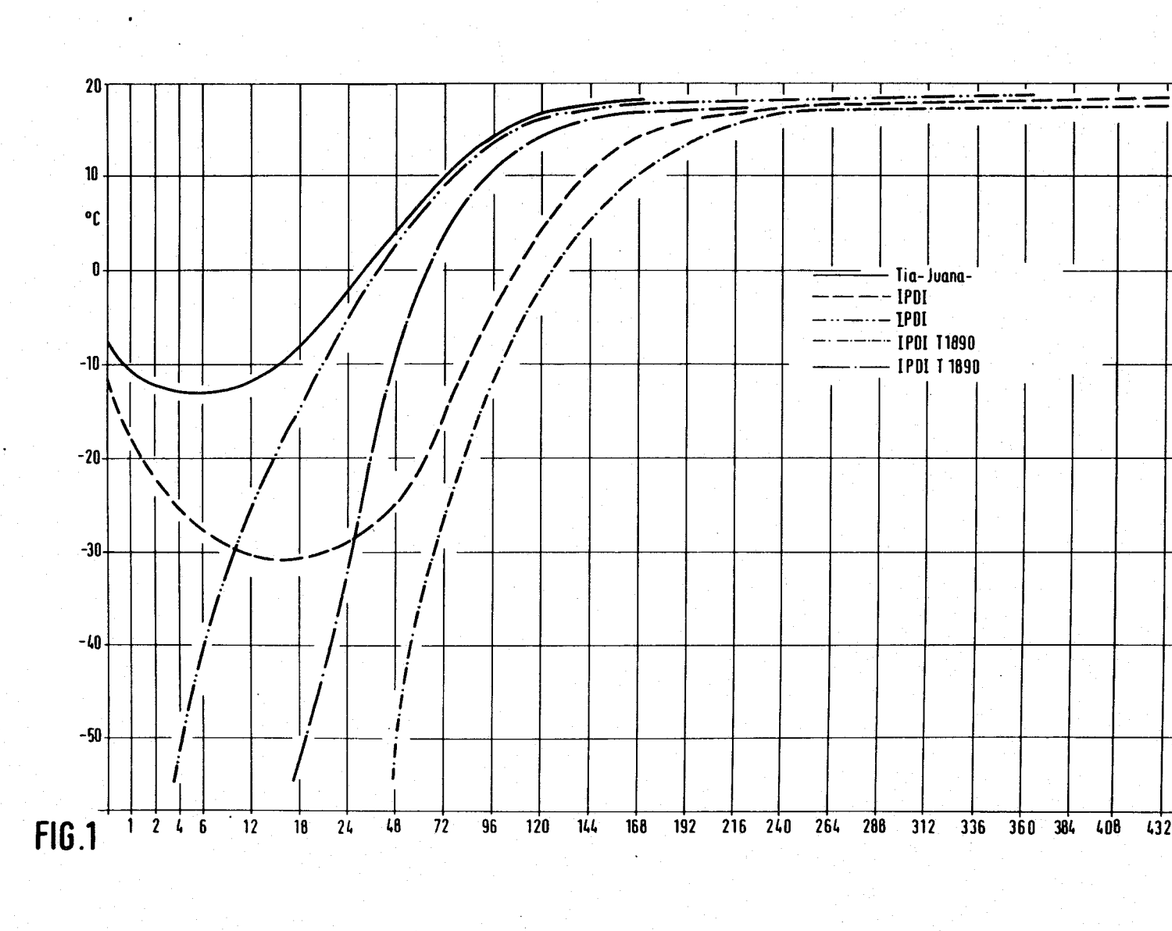
FIG. 1 illustrates the change in dew point in °C. plotted against time in hours for certain additives based upon the data set forth in Table 3.

The values obtained appear in Table 3 and in FIG. 1.

TABLE 3

Dew-points and water-contents above the covered brine

| Measuring Time | Tia-Juana-Oil | | 2.7% Isophorone-diisocyanate | | | | 6% IPDI T 1890/100 | | | |
|---|---|---|---|---|---|---|---|---|---|---|
| | | | 1. Charge | | 2. Charge | | 1. Charge | | 2. Charge | |
| | Dew-Point °C. | g $H_2O/m^3$ | Dew-Point °C. | g $H_2O/m^3$ | Dew-Point °C. | g $H_2O/m^3$ | Dew-Point °C. | g $H_2O/m^3$ | Dew-Point °C. | g $H_2O/m^3$ |
| 0 | −7.5 | 0.055 | −10.8 | 0.044 | −41.0 | <0.010 | −41.0 | <0.010 | −54.5 | <0.010 |
| 1 | −10.5 | 0.045 | −17.5 | 0.025 | −47.9 | <0.010 | −54.6 | <0.010 | −54.5 | <0.010 |
| 2 | −12.2 | 0.040 | −19.6 | 0.022 | −53.2 | <0.010 | −54.6 | <0.010 | −54.5 | <0.010 |
| 4 | −13.0 | 0.035 | −25.7 | 0.013 | −52.0 | <0.010 | −54.6 | <0.010 | −54.5 | <0.010 |
| 8 | −13.0 | 0.035 | −30.0 | 0.010 | −39.0 | <0.010 | −54.6 | <0.010 | −54.5 | <0.010 |
| 12 | −12.3 | 0.040 | −30.5 | 0.010 | −25.5 | 0.013 | −54.6 | <0.010 | −54.5 | <0.010 |
| 18 | −8.3 | 0.053 | −30.5 | 0.010 | −14.5 | 0.034 | −54.5 | <0.010 | −50.6 | <0.010 |
| 24 | −5.6 | 0.063 | −29.9 | 0.010 | −10.5 | 0.045 | −54.5 | <0.010 | −35.0 | <0.010 |
| 48 | 3.6 | 0.120 | −26.0 | 0.013 | 0.1 | 0.095 | −54.5 | <0.010 | −4.0 | 0.070 |
| 72 | 9.8 | 0.175 | −13.7 | 0.035 | 7.1 | 0.140 | −33.5 | <0.010 | 5.3 | 0.135 |
| 96 | 13.9 | 0.230 | −2.5 | 0.080 | 14.0 | 0.230 | −10.9 | 0.044 | 10.5 | 0.183 |
| 120 | 15.5 | 0.250 | 5.0 | 0.130 | 16.0 | 0.252 | −1.0 | 0.090 | 14.0 | 0.235 |
| 144 | 16.1 | 0.255 | 11.3 | 0.190 | 16.9 | 0.270 | 5.1 | 0.130 | 15.0 | 0.240 |
| 168 | 16.3 | 0.260 | 14.4 | 0.230 | 17.2 | 0.270 | 9.0 | 0.170 | 16.3 | 0.260 |
| 192 | 16.2 | 0.255 | 15.0 | 0.240 | 17.3 | 0.270 | 13.0 | 0.210 | 16.5 | 0.260 |
| 216 | 16.1 | 0.253 | 15.8 | 0.250 | 17.8 | 0.280 | 16.0 | 0.252 | | |
| 240 | 16.0 | 0.252 | 16.8 | 0.270 | 17.5 | 0.280 | 16.6 | 0.270 | | |
| 264 | 16.1 | 0.253 | 16.7 | 0.270 | 17.5 | 0.280 | 17.0 | 0.270 | | |
| 288 | 16.4 | 0.260 | 16.7 | 0.270 | 17.5 | 0.280 | 17.0 | 0.270 | | |
| 312 | 16.5 | 0.260 | 16.7 | 0.270 | 17.4 | 0.270 | 16.9 | 0.270 | | |
| 336 | 16.5 | 0.260 | 17.4 | 0.280 | 17.4 | 0.270 | 16.8 | 0.270 | | |
| 360 | 16.5 | 0.260 | 18.0 | 0.300 | 17.4 | 0.270 | 16.8 | 0.270 | | |
| 384 | 16.4 | 0.260 | 17.6 | 0.280 | | | 16.5 | 0.260 | | |
| 408 | 16.5 | 0.260 | 17.8 | 0.280 | | | 16.5 | 0.260 | | |
| 432 | 16.0 | 0.252 | 17.8 | 0.280 | | | 16.5 | 0.260 | | |

The diffusion-rate was also measured in the Tia Juana oil with no additives. The results appear in Table 4.

TABLE 4

Diffusion-rates of pure Tia Juana oil and oil with additives

| | Measuring time h | Dew-point °C. | Water-content g/$m^3$ | Diffusion-rate* g/$m^2$h |
|---|---|---|---|---|
| Tia-Juana oil without additives | 72 | 9.8 | 0.175 | 0.0751 |
| | 144 | 16.1 | 0.255 | 0.0547 |
| Tia-Juana oil + 2.7% Isophorone-diisocyanate | 1st charge | | | |
| | 72 | −13.7 | 0.035 | 0.0150 |
| | 144 | 11.3 | 0.120 | 0.0408 |
| | 2nd charge | | | |
| | 72 | 7.1 | 0.140 | 0.0601 |
| | 144 | 16.9 | 0.270 | 0.0579 |
| Tia-Juana oil + 6% Poly- | 1st charge | | | |
| | 72 | −33.5 | 0.007 | 0.0030 |
| | 144 | 5.1 | 0.130 | 0.0279 |

TABLE 4-continued

Diffusion-rates of pure Tia Juana oil and oil with additives

| | Measuring time h | Dew-point °C. | Water-content g/$m^3$ | Diffusion-rate* g/$m^2$h |
|---|---|---|---|---|
| isocyanate T 1890/100 | 2nd charge | | | |
| | 72 | 5.3 | 0.135 | 0.0579 |
| | 144 | 15.0 | 0.240 | 0.0515 |

*Calculated from brine surface, gas-content, (in standard condition)

The values obtained with the second charges exhibit a higher diffusion-rate than the first charges. This is attributable to slight foaming of the covering layer when the pressure was relieved, result in intermixture of the layer. With the layer thickness of only 10 mm this naturally affected water transportation.

TEST-GROUP 2

The feasibility of the invention was demonstrated in a laboratory test, as described hereinafter.

Brine was introduced into a pressure-vessel and was covered by a sump-cover 25 mm in thickness. The cover consisted of Boscan oil dried to a water-content of 0.05% and with an addition of 2% by weight of toluylene-diisocyanate. The pressure-vessel was then filled with natural gas at a pressure of 100 bars, the said natural gas having been dried to a dew-point of −17° C. at 100 bars. The test-temperature was 50° C. and the test ran for over 2.200 hours. The dew-point of the gas-charge was measured progressively.

Figure 2:
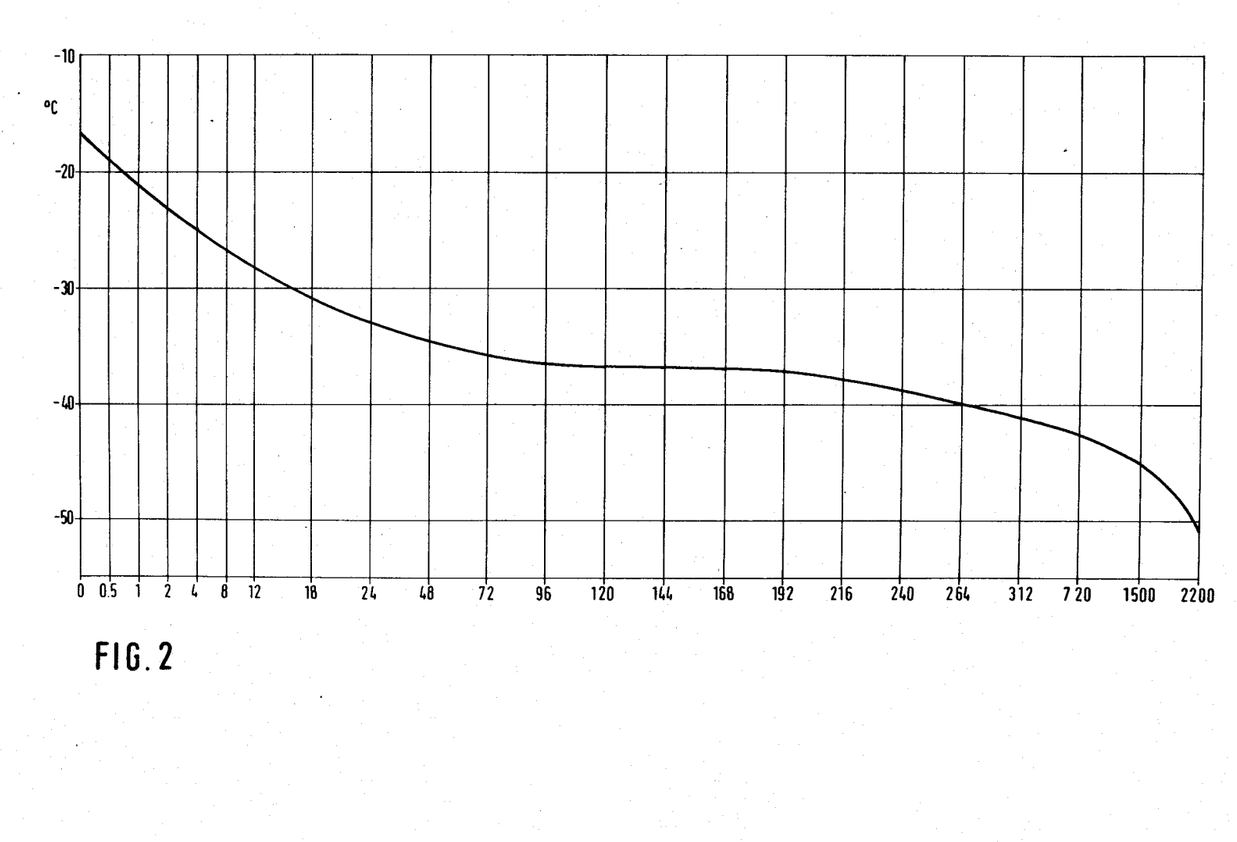
FIG. 2 illustrates the change in dew point in °C. plotted against time in hours for Boscan oil to which was added 2% by weight of toluylene-diisocyanate based on the data set forth in Table 5.

The change in the dew-point over the period of time appears in Table 5. The values from this table are also entered in FIG. 2.

TABLE 5

Dew-point in gas above covered brine (°C.)
Test conditions: 250 mm covering layer,
100 bars, 50° C.

| Testing Time h | Dew-point °C. |
| --- | --- |
| 0 | −17.2 |
| 0.5 | −19.6 |
| 1 | −20.7 |
| 2 | −21.5 |
| 4 | −24.5 |
| 8 | −27.7 |
| 12 | −28.6 |
| 18 | −30.0 |
| 24 | −30.8 |
| 48 | −34.6 |
| 72 | −35.8 |
| 96 | −37.0 |
| 120 | −34.3 |
| 144 | −37.0 |
| 168 | −37.3 |
| 192 | −37.1 |
| 216 | −39.0 |
| 240 | −40.8 |
| 264 | −40.0 |
| 312 | −41.0 |
| 720 | −42.0 |
| 1500 | −45.0 |
| 2200 | −50.8 |

This shows that the dew-point fell relatively rapidly, to wit after about 200 hours, to about −40° C. This is attributable to the excess of toluylene-diisocyanate which had produced drying of the gas. This drying process then continued still further, although substantially more slowly and to a substantially lesser degree.

The test showed that the sump-cover according to the invention, with a layer-thickness of 25 cm, is suitable for actual long-term storage over a period of many years. Since it may be assumed from practical experience that natural gas is always in and out of storage over short periods of time, the layer thickness of the sump-cover may be reduced substantially, with a corresponding reduction in costs.

The viscosity behaviour of the sump-cover appears in Table 6. The viscosity, measured at 80° C., rose relatively rapidly, namely from 0.69 to 4.0 Pa s in 120 hours. After this, the increase was substantially slower and substantially less.

The self-healing property of the sump-cover was retained. This was determined with a covering layer 1.5 cm in thickness upon the surface of which 1 ml of brine solution was placed. At 25° C. the brine took 150 minutes, and at 50° C. 6 minutes, to sink completely into the layer.

Finally, the reduction of the water-content in the sump-cover was demonstrated. As already indicated, the Boscan oil originally contained 0.05% of water. At the conclusion of the test, the surface of the covering layer contained 0.01%, and the interior, 10 cm above the brine, 0.034% of water.

TABLE 6

Viscosity increase in Boscan oil with an addition
of 2% by weight of toluylene-diisocyanate as a
function of reaction-time (measured at 80° C.)

| Reaction time h | Viscosity Pa s |
| --- | --- |
| 0 | 0.68 |
| 1 | 0.73 |
| 2 | 1.15 |
| 4 | 1.52 |
| 8 | 2.04 |
| 120 | 4.0 |
| 2200 | 4.56* |

*Measured in the covering liquid at the end of the test.

It will therefore be seen that the invention provides a liquid, or at least a fluid composition which, after being applied to the sump of a cavity, or generally to the surface of an aqueous medium, provides a covering which is closed and always recloses itself, the said cover being practically impermeable to water and reliably preventing evaporation of water, or of an aqueous solution, into a gaseous atmosphere, for example, over long periods of time. The invention is applicable wherever a liquid, aqueous medium is to be separated from an overlying, especially non-aqueous, column of gas of liquid. The reactive component, for example the isocyanate or the epoxy compound, may be applied to the surface of the sump or water mixed with crude oil; however, it may also be deposited upon a layer of crude oil already in situ, for example by spraying or dusting.

It is therefore clear that the expert may carry out certain changes in the above-described examples of the composition and the method with departing from the scope of the invention. It is therefore intended that the foregoing disclosure be regarded only as an example of the principles of the present invention. The scope of the invention is defined in the attached claims.

We claim:

1. A method for covering the sump in cavities, especially cavities leached out of salt-domes, serving to store gaseous or liquid, non-aqueous substances, said method comprising the following steps:
    (a) preparing a liquid mixture consisting of: a crude oil having functional groups and containing an amount not exceeding 7% by weight of hydrocarbons having at the most 5 C-atoms in the molecule, the specific weight thereof amounting, at a temperature of +20° C., to at the most 1.2 g/cm$^3$; and at least one reactive component which combines with the functional groups of the crude oil and blocks said groups;
    (b) applying said liquid mixture to, and distributing it over, the surface of the sump in an amount such as to form a layer at least 1 cm thick of the said mixture.

2. A method according to claim 1, in which, in step (a), an isocyanate is mixed with the crude oil as the reactive component.

3. A method according to claim 2, in which a polyfunctional isocyanate is mixed with the crude oil.

4. A method according to claim 3, in which toluylene-diisocyanate (Desmodur T 65) is mixed with the crude oil.

5. A method according to claim 3, in which a cycloaliphatic isocyanate (isophorone-diisocyanate IPDI) is mixed with the crude oil.

6. A method according to claim 3, in which trimerized isophorone-diisocyanate (polyisocyanate IPDI T 1980/100) is mixed with the crude oil.

7. A method according to claim 1, in which an epoxy compound is mixed with the crude oil in step (a) as the reactive component.

8. A method according to claim 7, in which the cycloaliphatic epoxy compound epoxycyclohexylohexylmethylepoxycyclohexane-carboxylate (Araldit CY 179 clarified) is mixed with the crude oil.

9. A method according to claim 7, in which a medium-viscosity epoxy resin based upon bisphenol A-epichlorhydrin (Eurepox 710) is mixed with the crude oil.

10. A method according to one of claims 1 to 9, in which the reactive component is mixed with the crude oil in an amount such that the NCO content thereof corresponds to that of an admixture of 2% by weight of toluylene-diisocyanate (Desmodur T 65).

11. A method according to claim 1, in which the reactive component is added before the introduction of the crude oil into the cavity.

12. A method according to claim 1, in which the reactive component is deposited, by spraying the same onto the layer of crude oil located on the surface of the sump.

13. A method according to claim 1, in which the reactive component is added during the introduction of the crude oil into the cavity.

14. A method according to claim 1, in which the reactive component is deposited by dusting the same onto the layer of crude oil located on the surface of the sump.

* * * * *